United States Patent
Magnusson et al.

(10) Patent No.: US 11,261,589 B2
(45) Date of Patent: Mar. 1, 2022

(54) CHECK VALVE AND A METHOD FOR CONTROLLING A FLOW OF FLUID BY FLUID PRESSURE

(71) Applicant: WAPRO AB, Karlshamn (SE)

(72) Inventors: Pontus Magnusson, Karlshamn (SE); Mats Persson, Karlshamn (SE)

(73) Assignee: Wapro AB, Karlshamn (SE)

( * ) Notice: Subject to any disclaimer, the term of this patent is extended or adjusted under 35 U.S.C. 154(b) by 0 days.

(21) Appl. No.: 16/958,238

(22) PCT Filed: Jan. 3, 2018

(86) PCT No.: PCT/EP2018/050106
§ 371 (c)(1),
(2) Date: Jun. 26, 2020

(87) PCT Pub. No.: WO2019/134740
PCT Pub. Date: Jul. 11, 2019

(65) Prior Publication Data
US 2020/0399879 A1 Dec. 24, 2020

(51) Int. Cl.
*E03C 1/298* (2006.01)
*F16K 15/14* (2006.01)
(52) U.S. Cl.
CPC ............ *E03C 1/298* (2013.01); *F16K 15/145* (2013.01)
(58) Field of Classification Search
CPC ....... E03C 1/298; F16K 15/145; F16K 15/147
See application file for complete search history.

(56) References Cited

U.S. PATENT DOCUMENTS

| 24,479 | A | * | 6/1859 | Mayall | E06B 9/50 160/242 |
| 2,347,988 | A | * | 5/1944 | Burke | F16K 15/147 137/217 |
| 2003/0183286 | A1 | * | 10/2003 | Yang | F16K 15/147 137/625.17 |
| 2004/0000348 | A1 | * | 1/2004 | Persson | F16K 15/145 137/853 |

FOREIGN PATENT DOCUMENTS

| EP | 1244882 B1 | 10/2002 |
| EP | 1577450 A1 | 9/2005 |
| EP | 3006632 A1 | 4/2016 |

\* cited by examiner

*Primary Examiner* — Reinaldo Sanchez-Medina
*Assistant Examiner* — Nicole Gardner
(74) *Attorney, Agent, or Firm* — Capitol City TechLaw

(57) ABSTRACT

A check valve (10) for controlling a flow of fluid by fluid pressure, comprising a housing (11) and a resilient flexible valve element (12) inside the housing (11), wherein the valve element (12) is formed as a hollow and longitudinally tapered body (16) with an open wide end (18) and a closed narrow end (19), and wherein the wide end (18) of the valve element (12), in a default configuration, engages an inner surface of the housing (11) to close the check valve (10) and is deformable by a predetermined fluid pressure from the inlet (13) to open the check valve (10). The tapered body (16) comprises a radially outwardly projecting flange (17) at the wide end (18), which flange comprises a curved outer surface portion (20) having a degree of curvature of 85 to 95 degrees, wherein the housing (11) is formed with a protrusion (29) having a curved surface (30) for engaging the curved outer surface portion (20) of the flange (17).

15 Claims, 8 Drawing Sheets

Figure 1:
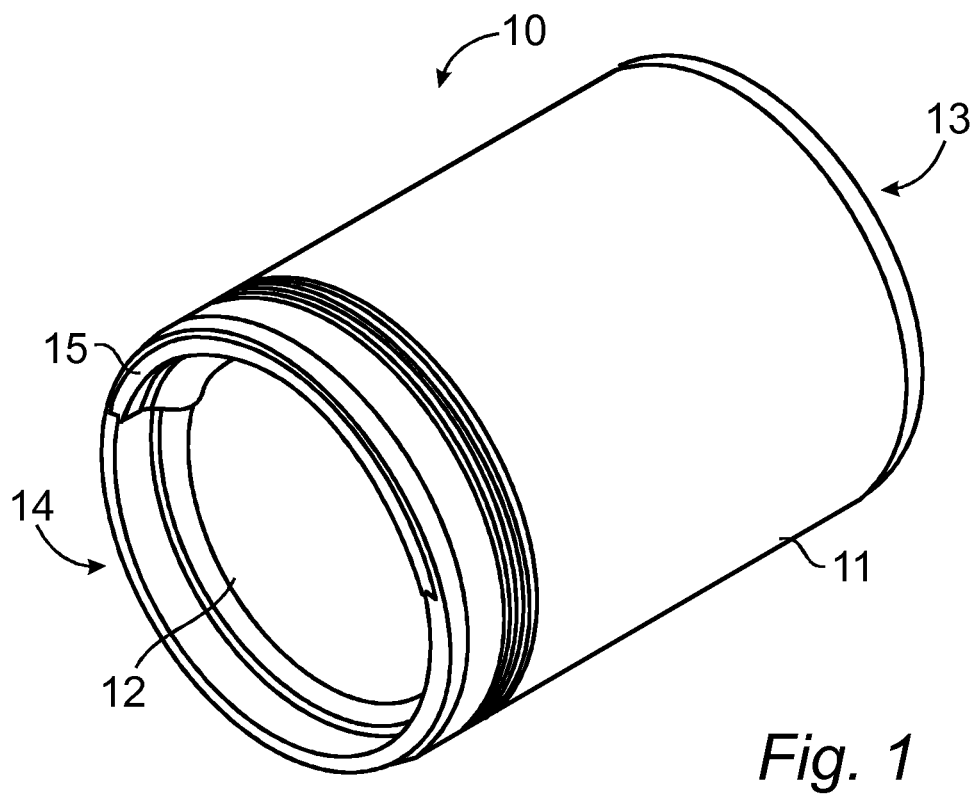

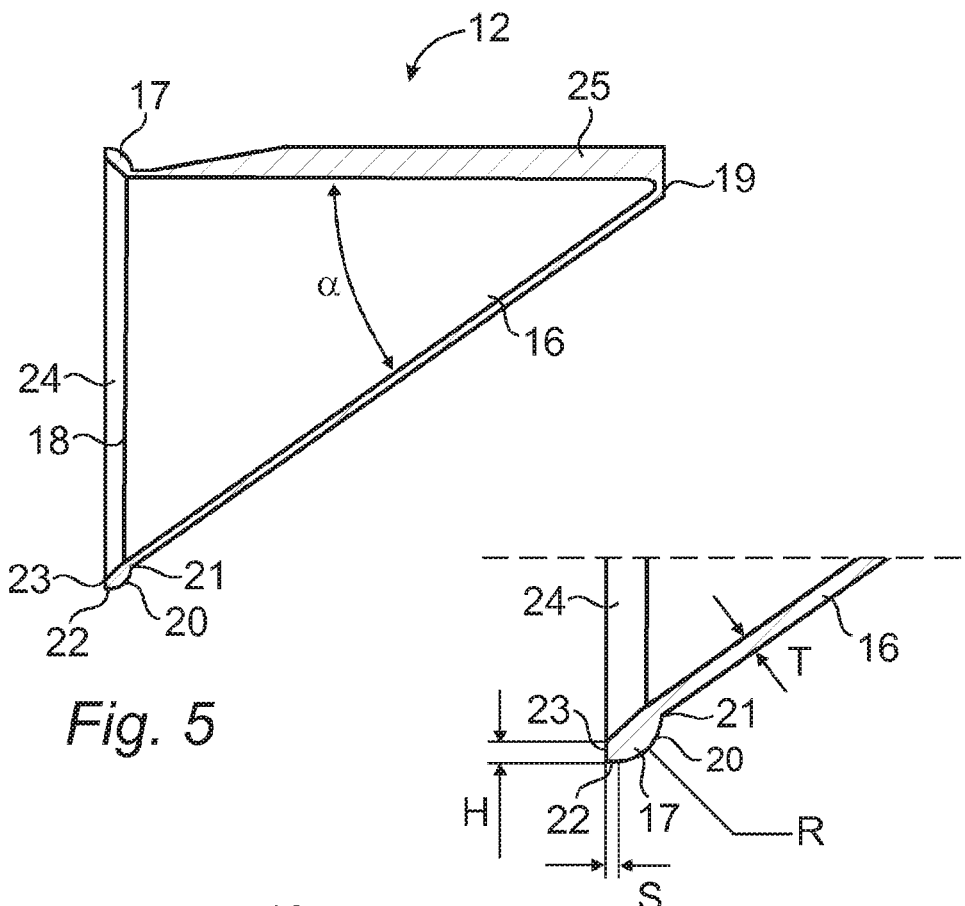
Fig. 5
Fig. 6
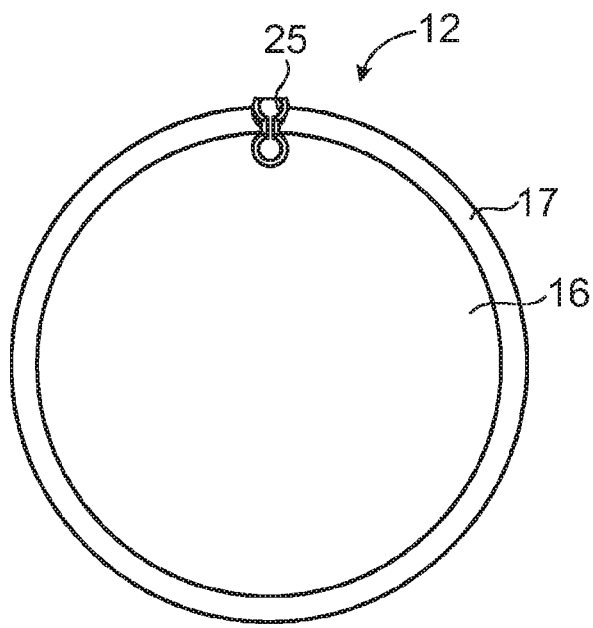
Fig. 7
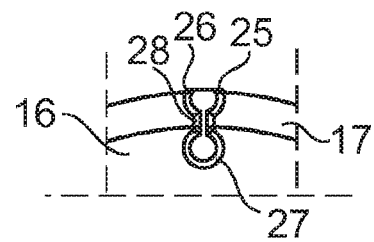
Fig. 8

CHECK VALVE AND A METHOD FOR CONTROLLING A FLOW OF FLUID BY FLUID PRESSURE

FIELD OF THE INVENTION

The invention relates to a check valve and a method for controlling a flow of fluid by fluid pressure. Check valves are one-way valves that allows fluids to flow through the check valve in only one direction, wherein a flow of fluid in a first direction is allowed and a flow of fluid in an opposite second direction is prevented.

This type of check valves and methods are generally used for controlling a flow of fluid in the form of liquids and/or gases. Such check valves can be used to prevent backflow in pipe systems and networks, such as domestic pipe systems and municipal and private pipe networks, e.g. in the form of wastewater or storm water pipe systems. Further, such check valves can be used to stop odours spreading, e.g. in pipe systems or through an inlet to a chamber or container. For example, this type of check valves can be used to protect wastewater and storm water pipe systems from backflow caused by high water levels in rivers, lakes, tidal areas and similar. Also, insects and small animals can be prevented from entering such pipe systems by means of such check valves.

PRIOR ART

There are several different types of check valves for controlling a flow of fluid by fluid pressure in the prior art. One such type of check valve is for example disclosed in EP1244882. The check valve disclosed in EP1244882 comprises conduit and a resilient flexible valve element operatively arranged therein by means of pressure. The valve element is arranged to allow a normal flow of fluid from an inlet towards an outlet of the conduit and to prevent a backflow in the opposite direction. The valve element comprises a hollow body with a tubular portion and a tapered portion, wherein the tubular portion has an open end and the tapered portion has a closed end. In a default configuration, when a fluid pressure on both sides of the valve element is substantially equal, the tubular portion of the valve element engages the inner surface of the conduit around its entire circumference for closing the valve. When the fluid pressure against the outside of the tapered end portion is increased by a normal flow the valve element will be deformed from its default configuration to open the valve. When the fluid pressure from the normal flow decreases the valve element will return to its default configuration by means of inherent resilient properties of the valve element. When the fluid pressure increases in an opposite direction by a backflow the valve element will be filled with fluid and forced against the inner surface of the conduit to keep the valve closed.

Even though the check valve according to EP1244882 has many advantages there is always a need to further improve the function and operation of such check valves.

SUMMARY OF THE INVENTION

An object of the present invention is to further improve check valves of the prior art. The check valve according to the invention results in improved operation both to prevent backflow and to allow the normal flow. The present invention results in an increased ability to withstand backflow pressure without leakage. Further, the present invention results in improved opening of the check valve for the normal flow, wherein the check valve according to the present invention will open more easily. A check valve opening for a flow in the normal direction at lower fluid pressure results in improved operation and also a wider field of use compared to prior art check valves. Also, according to various embodiments, a check valve allowing for fast, easy and reliable installation is provided.

The present invention relates to a check valve for controlling a flow of fluid by fluid pressure, comprising a tubular housing and a resilient flexible valve element arranged at least partially inside the housing, wherein the housing forms a conduit having a longitudinal axis for the fluid and comprises an inlet and an outlet for the fluid, wherein the valve element is formed as a hollow and longitudinally tapered body with an open wide end directed towards the outlet and a closed narrow end directed towards the inlet, and wherein the wide end of the valve element, in a default configuration, engages an inner surface of the housing to close the check valve and is deformable by a predetermined fluid pressure from the inlet to open the check valve, characterised in that the tapered body comprises a radially outwardly projecting flange at the wide end, that the flange comprises a curved outer surface portion having a degree of curvature of 85 to 95 degrees, and that the housing is formed with a protrusion having a curved surface for engaging the curved outer surface portion of the flange. The combination of the valve element and the curved surface of the protrusion results in that the valve element is easily deformed for improved opening of the check valve while backflow is efficiently prevented. The valve element being formed as a tapered body, such as substantially a cone or an oblique cone, being terminated with the flange results in reliable and efficient deformation of the valve element at relatively low fluid pressure in the normal flow direction to open the check valve. The curvature of the curved outer surface portion of the flange interacting with the corresponding curved surface of the housing has been found to provide a particularly efficient backflow prevention and reliable operation for a relatively long time. For example, the curved outer surface portion has a degree of curvature of 90 degrees, which can correspond to a quarter of a circle arc and which can extend between a longitudinal direction and a radial direction, has been found to provide even more efficient sealing properties. The curved surface of the protrusion can correspond to the curved outer surface portion of the flange to provide a snug fit.

The curved outer surface portion of the flange can be followed by a straight portion extending from the curved outer surface portion in the longitudinal direction towards the outlet. The straight portion results in increased contact surface towards the inside of the housing and increased sealing properties.

The valve element can comprise a straight interior circumferential edge portion at the wide end of the tapered body, which edge portion can be arranged in an oblique angle to the longitudinal axis when the valve element is in its default position. The edge portion can be arranged in parallel to a tangent plane of the centre of the curved outer surface portion of the flange in the default position of the valve element. The edge portion can be arranged at an angle of 45 to the longitudinal centre axis of the check valve when the valve element is in the default position. The combination of the curvature of the curved outer surface portion and the oblique interior edge portion results in that a backflow pressure forces the curved outer surface portion against the curved surface of the housing in a favourable angle, such as perpendicular to the middle of the curved surface, to provide efficient sealing of the check valve and to keep the valve element in position inside the housing during backflow. Hence, both operation for allowing normal flow and preventing backflow are improved, wherein normal flow at low fluid pressures are allowed while backflow even at high fluid pressures are efficiently prevented.

The check valve can comprise a resiliently flexible fastening element for clamping the valve element to the housing by a snap-fit locking function with the housing, e.g. by means of one or more interacting projections and corresponding recesses of the housing and fastening element. The fastening element and the housing can comprise interacting ribs and grooves for preventing displacement in the longitudinal direction, and also interacting projection and recess for preventing the fastening element from rotating inside the housing. The fastening element comprises a clamping surface for engaging a portion of the edge portion of the valve element. The structure of the fastening element, the housing and the valve element result in easy and reliable fastening of the valve element inside the housing, optionally in a detachable manner.

The valve element can comprise an exterior longitudinal tongue to be received in a corresponding groove of the housing. Hence, the valve element is efficiently guided into place and rotation of the valve element inside the housing is prevented. The tongue can be tapered towards the flange, forming an indentation for receiving a corresponding protrusion of the housing, which also contributes to preventing longitudinal displacement of the valve element inside the housing.

The valve element can be formed with a distinct edge between the flange and the tapered body, wherein the curved outer surface portion of the flange can be terminated with the distinct edge, and wherein the housing can be formed with a corresponding distinct edge. This shape has been found to efficiently seal the check valve and prevent backflow as the flange is pressed against the inside of the housing in the recess during high backflow pressures. The distinct edge of the flange in combination with the oblique interior edge portion efficiently prevents the flange from leaving the recess during backflows.

Disclosed is also a method for controlling a flow of fluid by fluid pressure, comprising the steps of
a) conducting fluid to an inlet in a tubular housing of a check valve, the housing having a longitudinal axis,
b) inside the housing conducting the fluid into contact with a resilient flexible valve element formed as a hollow longitudinally tapered body having an open wide end towards an outlet of the housing and a closed narrow end towards the inlet,
c) increasing the fluid pressure against the valve element to a predetermined threshold value,
d) by means of the increased fluid pressure deforming the valve element from a default configuration, in which a curved outer surface portion, having a degree of curvature of 85 to 95 degrees, of an outwardly projecting circumferential flange at the wide end of the tapered body is engaged with a corresponding curved surface of a protrusion of the housing to close the check valve, to a deformed configuration, in which the flange is disengaged from the curved surface around a portion of the circumference and thereby opening the check valve,
e) conducting fluid out from the housing through the outlet, and
f) returning the valve element to its default configuration by means of inherent resilient properties of the valve element when the fluid pressure is reduced to a level below the predetermined threshold value.

The method can also include the steps of bringing a backflow of fluid entering through the outlet to engage a straight interior circumferential edge portion at the wide end of the tapered body, and forcing the edge portion radially outwards by means of the edge portion being arranged in an oblique angle to the longitudinal axis and thereby pressing the flange into the recess. The edge portion can be forced radially outwards at an angle of 45 degrees to the longitudinal axis.

The disclosed check valve can easily be installed in a pipeline or chamber. It can be installed horizontally or vertically or at any angle and can be used to prevent substantially any types of backflow. Flow in the normal direction causes a pressure buildup against the valve element which causes the valve element to deform just enough to allow the normal flow to pass. When backflow occurs the valve element is filled with fluid, such as liquid and/or gas, and forces the valve element outwards to seal the check valve and prevent backflow.

Further characteristics and advantages of the present invention will become apparent from the description of the embodiments below, the appended drawings and the dependent claims.

SHORT DESCRIPTION OF THE DRAWINGS

Figure 2:
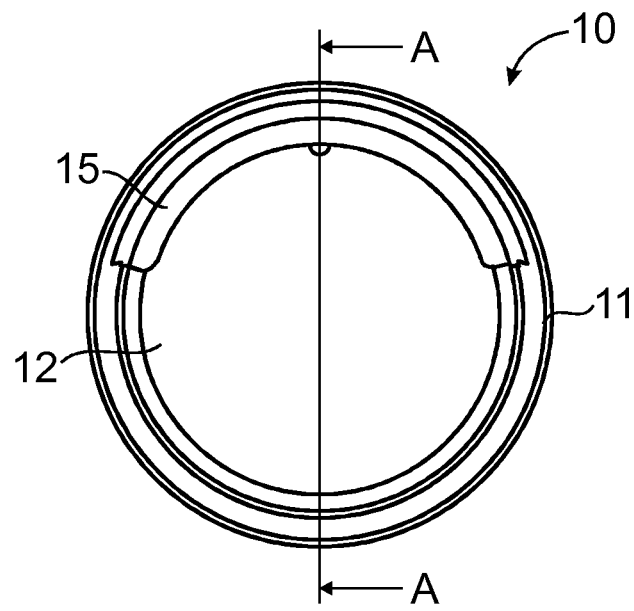
Figure 3:
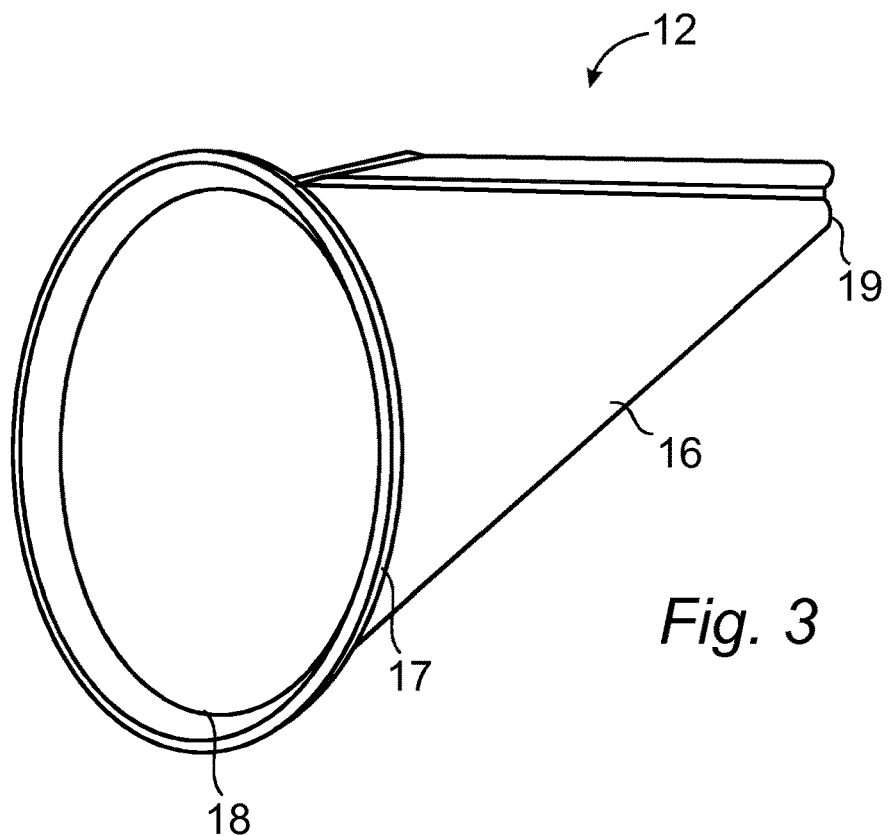
Figure 4:
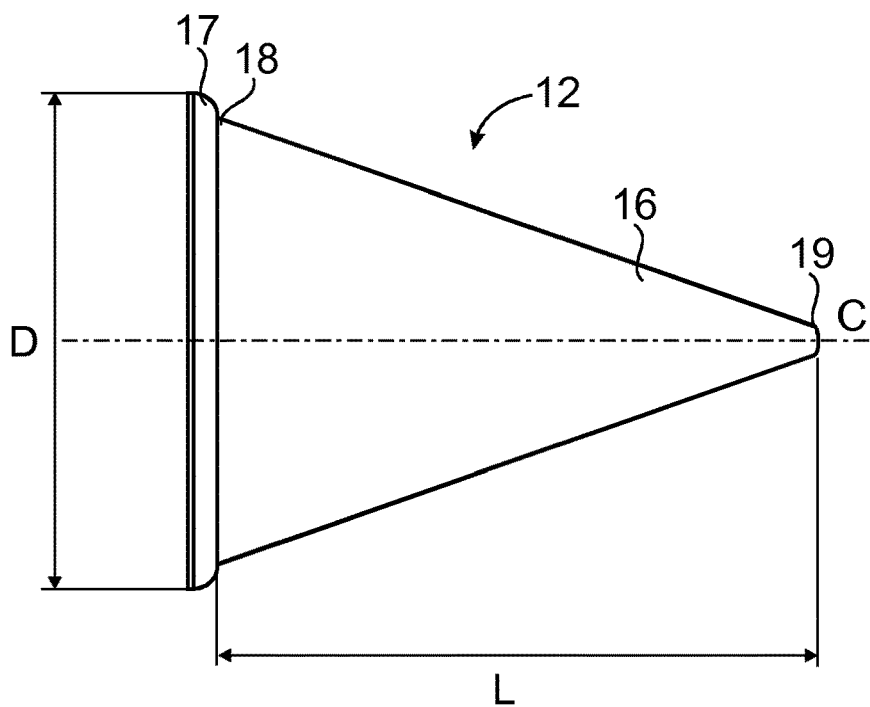
Figure 9:
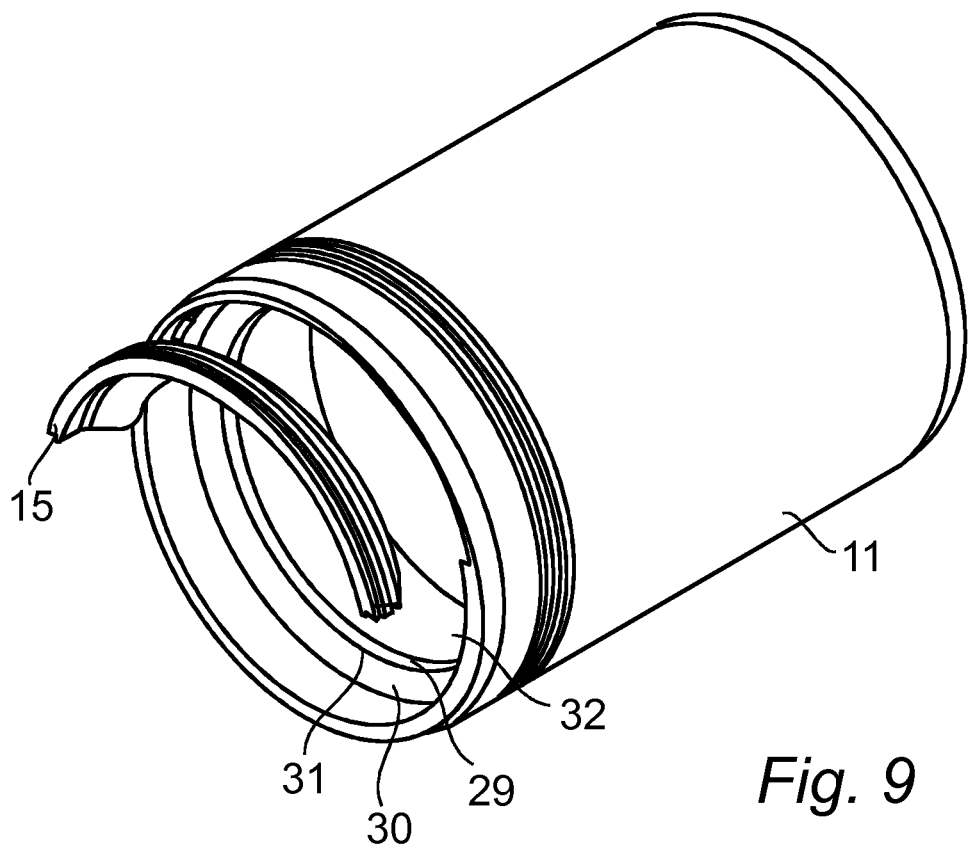
Figure 10:
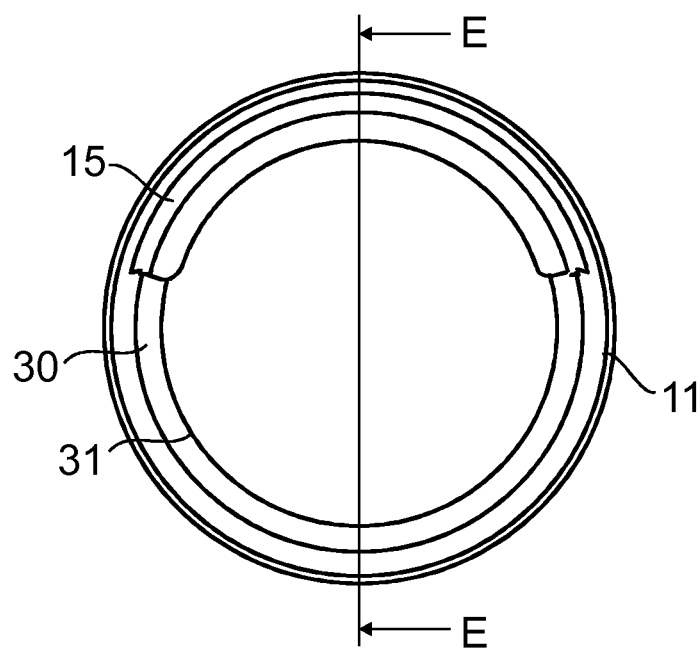
Figure 11:
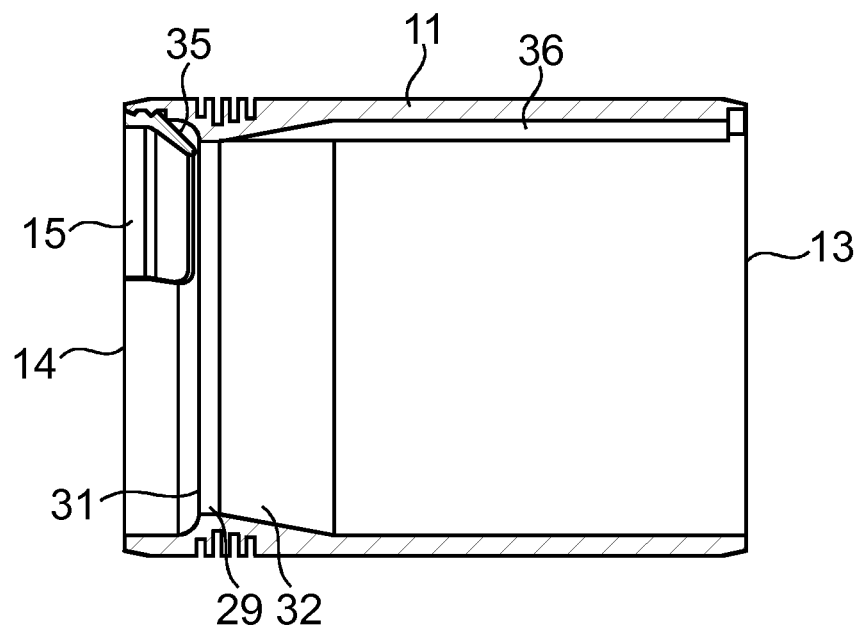
Figure 12:
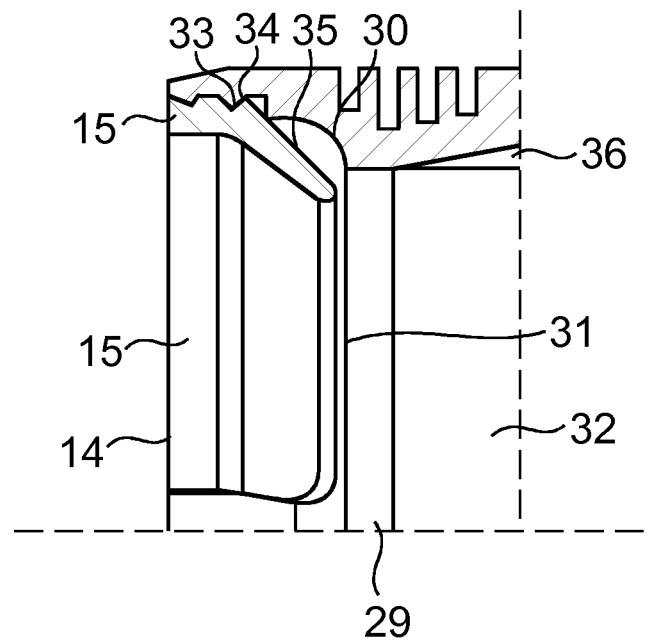
Figure 13:
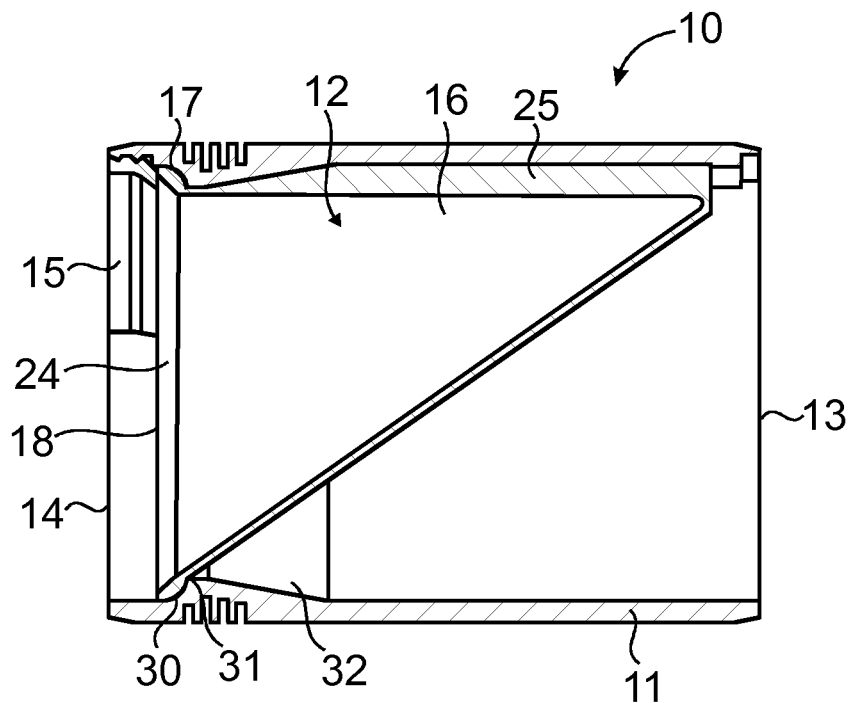
Figure 14:
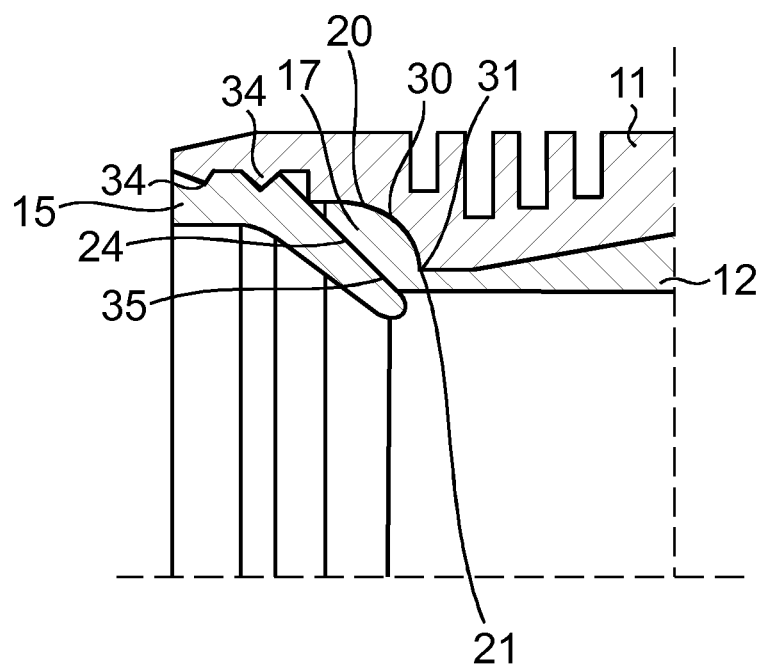
Figure 15:
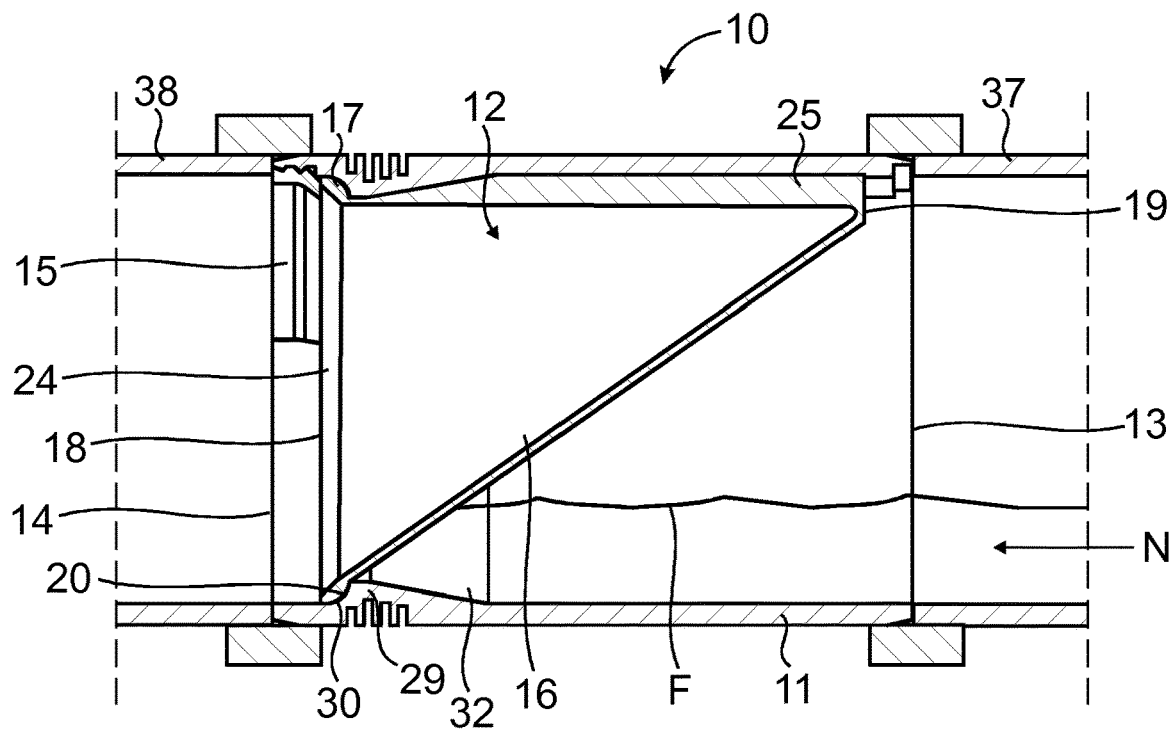
Figure 16:
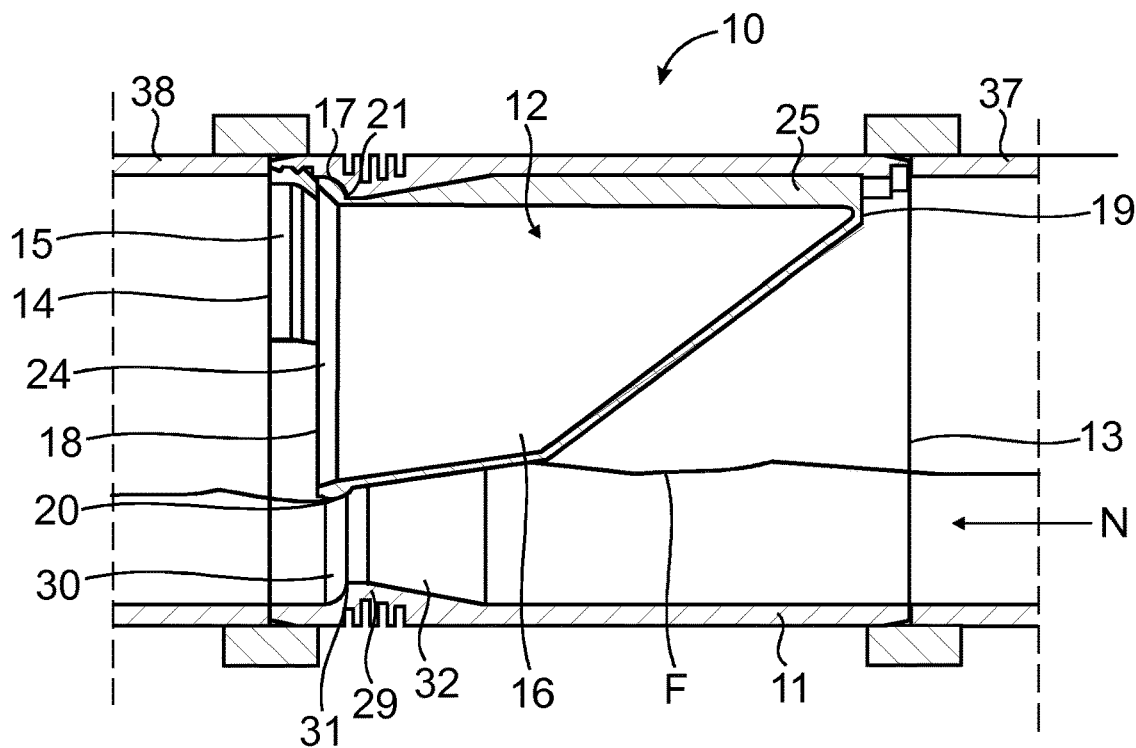
Figure 17:
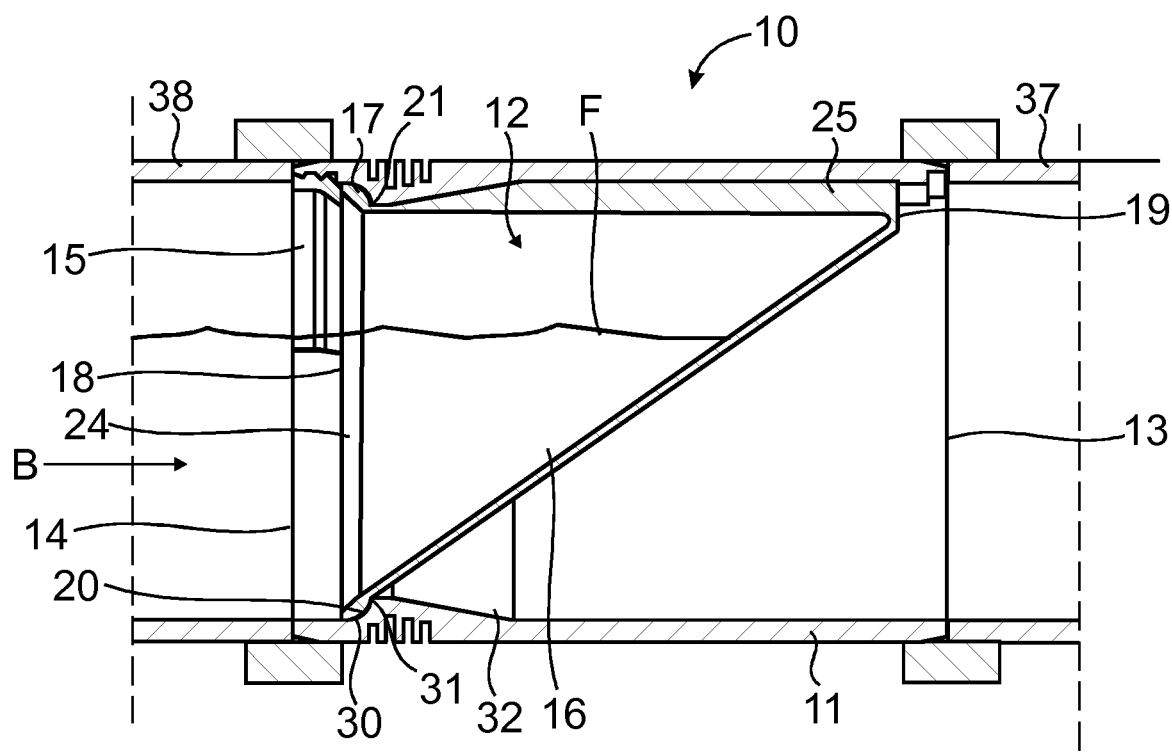
Figure 18:
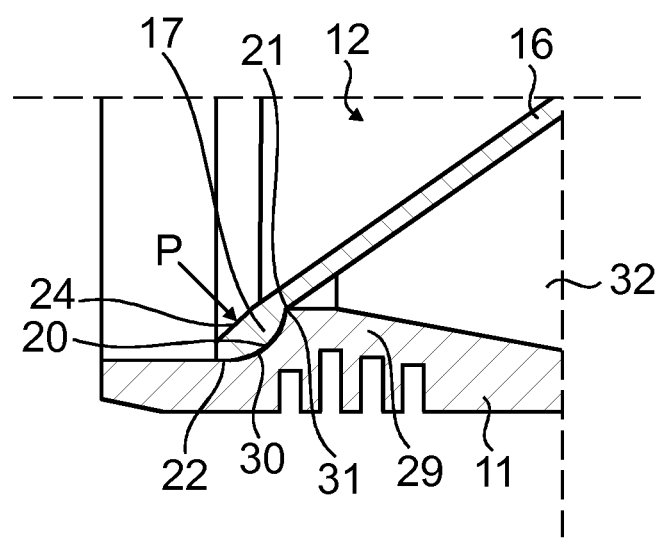

The invention will now be described more in detail with the aid of embodiments and with reference to the appended drawings, in which FIG. 1 is a schematic perspective view obliquely from an outlet side of a check valve for controlling a flow of fluid by fluid pressure according to one embodiment, showing a tubular housing, a fastening element and a part of a valve element of the check valve, FIG. 2 is a schematic view from the outlet side of the check valve according to FIG. 1, wherein the check valve is closed, FIG. 3 is a schematic perspective view of the valve element according to one embodiment, wherein the valve element is illustrated in a default configuration for closing the check valve, FIG. 4 is a schematic side view of the valve element according to FIG. 3, FIG. 5 is a schematic longitudinal section view along the centre line of the valve element of FIG. 4, FIG. 6 is a schematic view of a part of a wide end of the valve element of FIG. 5, illustrating a flange and a straight interior circumferential edge portion of the valve element, FIG. 7 is a schematic view of the valve element according to one embodiment from the outlet side, FIG. 8 is a schematic view of a part of the valve element according to FIG. 7, illustrating a tongue thereof, FIG. 9 is a schematic perspective view of the housing and the fastening element according to one embodiment, wherein the fastening element has been detached from the housing, FIG. 10 is a schematic view of the housing and fastening element of FIG. 9 from the outlet side, FIG. 11 is a schematic longitudinal section view of the housing and the fastening element along the line B-B of FIG. 10, FIG. 12 is a schematic section view of the fastening element and a part of the housing of FIG. 11, FIG. 13 is a schematic longitudinal section view of the check valve along the line A-A of FIG. 2, showing the check valve according to one embodiment, FIG. 14 is a schematic section view of a part of the check valve of FIG. 13, illustrating clamping of the valve element to the housing by means of the fastening element, FIG. 15 is a schematic longitudinal section view, showing the check valve of FIG. 13 arranged in a pipe system and in closed configuration, wherein a fluid flow through the inlet is illustrated, FIG. 16 is a schematic longitudinal section view, showing the check valve of FIG. 15 in open configuration, wherein the fluid is flowing through the check valve, FIG. 17 is a schematic longitudinal section view, showing the check valve of FIG. 15 in closed configuration preventing a backflow, and FIG. 18 is a schematic longitudinal section view of a part of the check valve of FIG. 17.

THE INVENTION

With reference to FIGS. 1 and 2 a check valve 10 for controlling a flow of fluid by fluid pressure according to one embodiment is illustrated schematically. The check valve 10 is arranged for allowing a fluid flow in one direction, a so-called normal direction, and prevent a backflow in the opposite direction, a so-called backflow direction. For example, the check valve 10 is arranged for installation in or as part of a pipe system, such as a domestic, private or municipal water supply system, waste water system, a sewerage or similar. Alternatively, the check valve 10 is arranged for installation in any gas and/or liquid pipe system or container system for handling gas and/or liquid with or without debris or other wastes. For example, the check valve 10 is arranged for installation in a vacuum sewage system to allow passage of sewage in one direction and prevent a backflow of odour in the opposite direction. Hence, fluid as used herein includes liquids, gases and combinations thereof, optionally also including solid or semi-liquid material, such as debris, mud, wastes and similar.

The check valve 10 comprises a tubular housing 11 and a valve element 12 operatively arranged inside the housing 11. The housing 11 is formed as a conduit or pipe element having an inlet 13 and an outlet 14 for the fluid, wherein a direction from the inlet 13 to the outlet 14 is the normal direction and the opposite direction is the backflow direction. The housing 11 is arranged with a rounded cross section. In the illustrated embodiment the housing 11 is arranged with circular cross section. Alternatively, the housing 11 is arranged with an oval or elliptic cross section. For example, the housing 11 is arranged in plastic materials, such as polyethylene, PVC or other suitable plastic materials. Alternatively, the housing 11 is arranged in metal or a metal alloy, such as stainless steel, aluminium or other suitable alloys.

The valve element 12 is arranged inside the housing 11 and is connected to the interior of the housing 11 to keep the valve element 12 in place therein. The valve element 12 is arranged entirely or at least partially inside the housing 11. In the illustrated embodiment, the valve element 12 is attached to the housing 11 through a fastening element 15, which is described in more detail below.

The valve element 12 is illustrated without the housing 11 in FIGS. 3-8. The valve element 12 is arranged in a resilient flexible material, such as an elastomer material, rubber or similar, wherein it is deformable from a default configuration to a deformed configuration upon application of a force and then returns to its default configuration when the application of the force ceases. The valve element 12 is illustrated in its default configuration in FIGS. 3-8 and any given dimensions and angles are given for the valve element 12 in its default configuration. For example, the valve element 12 is formed in polyurethane. The valve element 12 is impermeable to water or at least substantially impermeable to water. For example, the valve element 12 is also impermeable to gas, such as methane gas and other odorous gases. Hence, according to one embodiment the valve element 12 is both liquid and gas proof.

The valve element 12 comprises a tapered body 16 and an outwardly projecting flange 17. The valve element 12 and the tapered body 16 has a wide end 18 and a narrow end 19. In the illustrated embodiment the tapered body 16 is continuously tapered between the wide and narrow ends 18, 19, e.g. with the same angle from the wide end 18 to the narrow end 19. For example, the tapered body 16 is formed substantially as a cone, such as an oblique circular cone. The tapered body 16 is, e.g. terminated with the flange 17 at the wide end. Hence, in the illustrated embodiment the outer circumference adjacent to the base of the cone shaped tapered body 16 is formed with the flange 17. The flange 17 extends around the circumference of the tapered body 16, such as around the entire circumference of the wide end 18 of the tapered body 16, wherein the flange 17 is continuous, closed and ring shaped.

With reference particularly to FIG. 4 the valve element 12 has a longitudinal centre axis C, which also is the longitudinal centre axis of the tapered body 16. The valve element 12 is formed with suitable dimensions for the desired application. For example, the check valve 10 is arranged for pipes having an inner diameter of 10-2100 mm, wherein a largest outer diameter D of the valve element 12 is 10-2100 mm or slightly more than the inner diameter of the pipes. For example, the diameter D at the wide end 18 is 101 mm. For example, the length L of the valve element 12 is larger than the diameter D, such as about 25% larger. For a valve element 12 having the diameter D of 101 mm at the wide end 18 the length L of the tapered body 16, i.e. excluding the flange 17 is, e.g. 122 mm.

As illustrated particularly in FIG. 5, the tapered body 16 is arranged with an apex angle $\alpha$ of 30-45 degrees or about 35 degrees. For example, the entire length of the tapered body 16 is arranged with the same interior apex angle $\alpha$ up to the flange 17. For example, a first part of the tapered body 16 is arranged in parallel to the centre axis C and hence extends in the longitudinal direction.

With reference particularly to FIG. 6 the flange 17 of the valve element 12 and the wide end 18 of the tapered body 16 are illustrated more in detail. The flange 17 comprises a curved outer surface portion 20 having a degree of curvature of 85 to 95 degrees or 90 degrees. For example, the curved outer surface portion 20 is formed as a part of a circle or ellipse, i.e. an arc. According to one embodiment the curved outer surface portion 20 is formed as an arc turning 85 to 95 degrees or 90 degrees, wherein the angle between a first end of the curved outer surface portion 20 and a second end of the curved outer surface portion 20 is 85 to 95 degrees or 90 degrees. For example, the curved outer surface portion 20 is formed as an arc corresponding to a quarter circle. For example, the curved outer surface portion 20 extends from a radially directed first end to an axially directed second end. For example, an outer radius R of the flange 17 is 1-25 mm, 2-10 mm, 4-6 mm or 5 mm. For example, a valve element 12 having a tapered body 16 with a length L of 122 mm and a diameter D of the wide end 18 of 101 mm has a radius R of the flange 17 of 5 mm. In the illustrated embodiment, the first end of the curved outer surface portion 20 is directly connected to the outer surface of the tapered body 16 forming a distinct edge 21 to the outer surface of the tapered body 16. In the illustrated embodiment, the opposite second end of the curved outer surface portion 20 is directly followed by a straight portion 22 extending from the second end of the curved outer surface portion 20 in the longitudinal direction towards the outlet 14. For example, the flange 17 is terminated at the wide end 18 of the valve element with the straight portion 22. For example, the straight portion 22 is arranged with a length S of at least 0.5 mm, such as 0.5 to 30 mm or 0.5 to 10 mm. For example, the length S of the straight portion is at least 1 mm. In the illustrated embodiment, the straight portion 22 is followed by a radially extending surface 23. For example, the radially extending surface 23 is straight, level and extends perpendicular to the straight portion 22 of the flange 17. The radially extending surface 23 is arranged with a height H of not more than 5 mm or not more than 2 mm or less than 2 mm. As illustrated with reference to FIG. 6, a thickness T of the wall of the tapered body 16, i.e. excluding the flange 17, is, for example 1-10 mm, such as 2 mm for a tapered body 16 having a length L of 122 mm and a diameter D of the wide end 18 of the valve element 12 of 101 mm.

The valve element 12 comprises a circumferential interior edge portion 24. The interior edge portion 24 is arranged at the wide end 18 of the tapered body 16. The interior edge portion 24 is arranged opposite to the flange 17, wherein the flange 17 projects radially outwardly at the wide end 18 of the tapered body 16 while the interior edge portion 24 is arranged on the interior side at the wide end 18. Hence, the tapered body 16 is terminated at the wide end 18 with the flange 17 on the outer side and the interior edge portion 24 on the inner side. The interior edge portion 24 is arranged in an oblique angle to the longitudinal axis C. For example, the interior edge portion 24 is a flat straight surface. The interior edge portion 24 is, e.g. arranged perpendicular to an imaginary radius line R through the centre of the curved outer surface portion 20. Hence, the interior edge portion 24 extends in a plane parallel to a tangent plane to the middle of the curved outer surface portion 20, i.e. along a line in which the flange 17 is thickest and the distance between the interior edge portion 24 and the curved outer surface portion 20 is at its biggest. For example, the interior edge portion 24 is arranged at an angle of 40-50, such as 45, to the longitudinal centre axis C. In the illustrated embodiment, the interior edge portion 24 is arranged to form a chamfer of the tapered body 16, at least around a portion of its circumference, at the inner side of the wide end 18. Hence, the interior edge portion 24 is arranged in an oblique angle outward in relation to the longitudinal axis C to further widen the interior side of the wide end 18. In the illustrated embodiment the interior edge portion 24 extends around the entire interior circumference of the valve element 12. Hence, the interior edge portion 24 is arranged with an angle to the longitudinal axis C being larger than the angle α of the tapered body 16.

With reference particularly to FIGS. 3, 5, 7 and 8 the illustrated embodiment of the valve element 12 comprises an optional tongue 25. The tongue 25 is arranged on the exterior of the tapered body 16 and extends in the longitudinal direction thereof, wherein the tongue 25 projects in a radial plane. For example, the tongue 25 is elongated. In the illustrated embodiment, the tongue 25 is tapered towards the flange 17 so that the height of the tongue 25 is decreased towards the flange 17. With reference particularly to FIGS. 7 and 8 the tongue 25 is substantially formed as two parallel and radially displaced cylindrical portions 26, 27 connected to each other through a connecting portion 28.

With reference to FIGS. 9-12 the housing 11 and the fastening element 15 are illustrated according to one embodiment without the valve element 12. The housing 11 is formed with a protrusion 29 having a curved surface 30 for engaging the curved outer surface portion 20 of the flange 17. Hence, the curved surface 30 of the protrusion 29 corresponds to the curved outer surface portion 20 of the flange 17. The curved surface 30 of the protrusion 29 extends around the entire interior circumference of the housing 11 and is arranged for engaging the curved outer surface portion 20 around the entire circumference of the flange 17 when the valve is closed. For example, the curved surface 30 is generally directed towards the outlet 14 and prevents the valve element 12 from displacement in the longitudinal direction towards the inlet 13. For example, the curved surface 30 extends from a first end being arranged substantially in the longitudinal direction C to a second end being arranged substantially perpendicular to the longitudinal direction C. Hence, the curved surface has a curvature of around 85-95 degrees or 90 degrees and is, e.g. formed as a quarter of a circle and has a radius corresponding to the radius of the curved outer surface portion 20 of the flange 17. The protrusion 29 is formed with a distinct edge 31 corresponding to the distinct edge 21 of the flange 17. The protrusion 29 is, for example arranged with a tapered surface 32 tapered towards the inlet 13, wherein the protrusion 29 is arranged with lower height towards the inlet 13. The distinct edge 31 is arranged between the curved surface 30 and the tapered surface 32. For example, the curved surface 30 is terminated with the distinct edge 31. The curved surface 30 is arranged to engage the flange 17 to prevent the valve element 12 from being displaced towards the inlet 13, e.g. due to a high backflow pressure. For example, the curved surface 30 is also arranged to support the valve element 12 when a backflow pressure forces the wide end 18 of the tapered body 16 outwards.

With reference particularly to FIG. 12 the fastening element 15 is arranged for fastening the valve element 12 to the housing 11. The fastening element 15 is arranged resiliently flexible and with a profile to form a snap-in fastening function with the housing 11. Hence, the fastening element 15 is arranged for fastening to the housing 11 through the inherent resiliently flexible properties of the fastening element 15. For example, the fastening element 15 is arched, wherein the ends of the fastening element 15 is resiliently displaceable towards each other, so that the fastening element 15 is insertable into the housing 11 in a compressed configuration and is expandable inside the housing 11. For example, the fastening element 15 is arranged for fastening the valve element 12 by clamping it to the housing 11. For example, the fastening element 15 is arranged for engaging a portion of the interior circumference of the housing 11 and the valve element 12, such as less than half of the circumference thereof. For example, the fastening element 15 is arranged for engaging a portion of the interior circumference of the housing 11 and the valve element 12. In the illustrated embodiment, one of the housing 11 and the fastening element 15 comprises at least one projection 33, such as a ridge, and the other comprises at least one recess 34, such as a groove, for receiving the projection to prevent displacement between the fastening element 15 and the housing 11. For example, the projection is a radially extending ridge, and the recess is a radially extending groove. The fastening element 15 comprises a clamping surface 35 for engaging a portion of the interior edge portion 24 of the valve element 12, which is illustrated in FIGS. 13 and 14. Hence, in a portion of the circumference the flange 17 is clamped between the fastening element 15 and the curved surface 30 of the housing 11. For example, the clamping surface 35 extends obliquely to the longitudinal axis C and substantially in parallel to the edge portion 24 of the valve element 12, such as 45 degrees to the longitudinal axis C.

With reference particularly to FIG. 11 the housing 11 is formed with a groove 36 for receiving the tongue 25 of the valve element 12. Hence, the groove 36 extends in the longitudinal direction C of the check valve 10.

With reference to FIG. 13 a section view along a longitudinal centre axis C of the check valve 10 is illustrated schematically. For example, the housing 11 extends in the longitudinal direction C and is, e.g. straight, wherein the inlet 13 and the outlet 14 are aligned, longitudinally displaced and arranged in parallel, so that they are spaced apart to form a gap between them. The check valve 10 is arranged to be mounted with its longitudinal axis at any angle, such as horizontally, vertically or at an oblique angle.

As illustrated in FIG. 13 the valve element 12 is formed with the wide end 18 open and the narrow end 19 closed, wherein the valve element 12 is hollow and the tapered body 16 is open in a direction towards the outlet 14 and closed in a direction towards the inlet 13. Hence, the tapered body 16 is tapered in the longitudinal direction C towards the inlet 13. In the illustrated embodiment the narrow end 19 of the tapered body 16 is displaced radially from the longitudinal centre axis C.

For example, a first portion of the tapered body 16 is arranged in the longitudinal direction along the inner surface of the housing 11, wherein a radially opposite second portion of the tapered body 16 is inclined in relation to the longitudinal axis C. In the illustrated embodiment, the first portion of the tapered body 16 engages the inner surface of the housing 11 and is arranged in parallel therewith and in parallel with the longitudinal axis C, wherein the second portion extends substantially diagonally through the housing 11. For example, the first portion is a top portion and the second portion is a lower portion when the longitudinal axis C is horizontal.

With reference to FIG. 15 a part of a pipe system is illustrated schematically according to one embodiment, wherein the check valve 10 is arranged between a first pipe 37 and a second pipe 38. Hence, the illustrated embodiment is an inline installation. Alternatively, the check valve 10 is arranged at an inlet or outlet in a pipe system, wherein the check valve 10 is arranged in an inlet installation or an outlet installation. Alternatively, the check valve 10 is arranged at an inlet or outlet to a container, chamber or similar, wherein the check valve 10 is arranged in a chamber installation.

In FIG. 15 a fluid, such as waste water which can include liquids, gases, and/or semiliquid materials possibly in combination also with solid materials, is indicated by means of the wavy line F. The fluid F is entering the check valve 10 through the inlet 13 from the first pipe 37 in a direction illustrated by means of the arrow N, wherein the arrow N illustrates a normal flow direction. In FIG. 15 the check valve 10 is closed, wherein the valve element 12 is in its default configuration and the flange 17 engages the curved surface 30 of the housing 11 around the entire circumference thereof. In the illustrated embodiment, the narrow end 19 of the tapered body 16 is arranged towards the inlet 13. Hence, in the default configuration of the valve element 12 the wide end 18 of the tapered body 16 engages the inner surface of the housing 11 to close the check valve 10. The fluid flow into the check valve 10 results in a fluid pressure against the valve element 12. The fluid flow into the check valve 10 from the inlet 13 results in a fluid pressure against the exterior surface of the tapered body 16. Hence, the fluid flow engages the exterior inclined surface of the tapered body 16, i.e. the surface of the tapered body 16 obliquely facing the inlet 13. When the fluid pressure against the exterior side of the tapered body 16 exceeds a threshold value for deforming the valve element 12 the valve element 12 deforms to open the check valve 10, which is illustrated schematically in FIG. 16. Hence, in FIG. 16 the valve element 12 is deformed by fluid pressure against it from the inlet 13, wherein the check valve 10 is open to let the fluid pass in the normal direction from the inlet 13 to the outlet 14 as illustrated by the arrow N. According to one embodiment, the fluid pressure required for opening the check valve 10 by deformation of the valve element 12 is predetermined, such as by adapting the material properties and thickness of the valve element 12, which e.g. is made in a conventional manner by a skilled person in view of the present disclosure. When the fluid pressure against the exterior surface of the valve element 12 is decreased the valve element 12 returns to its closed default position by the inherent resilient flexible properties thereof.

With reference to FIG. 17 a backflow is illustrated wherein the fluid F enters through the outlet 14 and flows into the check valve 10 in a direction illustrated by means of the arrow B. The backflow enters into the interior of the hollow tapered body 16 through the wide end 18 thereof, wherein the check valve 10 remains closed and the backflow is stopped. The backflow fluid engages the oblique interior edge portion 24 of the tapered body 16 and forces the edge portion 24 towards the inner surface of the housing 11, which is illustrated by means of the arrow P in FIG. 18. Hence, the backflow exerts a pressure on the edge portion 24 and presses the flange 17 and the curved outer surface portion 20 thereof towards the curved surface 30 to keep the check valve 10 closed. The inclined edge portion 24 results in a force directed obliquely outwards in the radial direction to press the wide end 18 of the tapered body 16 in the corresponding direction, such as 45 degrees to the longitudinal centre axis C, and forces the flange 17 towards the curved surface 30 of the housing 11 in said direction to prevent the backflow from leaking. In FIG. 17 the backflow is illustrated schematically. For example, the backflow fills the tapered body 16 and exerts a pressure around the entire interior circumference of the tapered body 16 and towards the entire edge portion 24. When the backflow pressure increases the force applied on the edge portion 24 is also increased to keep the check valve 10 closed.

The invention claimed is:

1. A check valve for controlling a flow of a fluid by fluid pressure, the check valve comprising:
   a tubular housing; and
   a resilient flexible valve element arranged at least partially inside the housing;
   wherein the housing forms a conduit having a longitudinal center axis for the fluid, and has an inlet and an outlet for the fluid;
   wherein the valve element is formed as a hollow and longitudinally tapered body with an open wide end directed towards the outlet and a closed narrow end directed towards the inlet;
   wherein the wide end of the valve element, in a default configuration, engages an inner surface of the housing to close the check valve and is deformable by a predetermined fluid pressure from the inlet to open the check valve;

wherein the tapered body has a radially outwardly projecting flange at the wide end;

wherein the flange has a curved outer surface portion having a degree of curvature of 85 to 95 degrees;

wherein the housing is formed with a protrusion having a curved surface for engaging the curved outer surface portion of the flange;

wherein the tapered body of the valve element includes an exterior longitudinal tongue; and wherein the housing includes a groove for receiving the tongue to prevent rotation of the valve element relative the housing.

2. The check valve according to claim 1, wherein the curved outer surface portion has a degree of curvature of 90 degrees.

3. The check valve according to claim 1, wherein the curved surface of the protrusion corresponds to the curved outer surface portion of the flange.

4. The check valve according to claim 1, wherein the curved outer surface portion of the flange is followed by a straight portion extending from the curved outer surface portion in a longitudinal direction towards the outlet.

5. The check valve according to claim 1, wherein a straight circumferential interior edge portion at the wide end of the tapered body is arranged in an oblique angle to a longitudinal axis.

6. The check valve according to claim 5, wherein the straight circumferential interior edge portion is arranged perpendicular to an imaginary radius line through the center of the curved outer surface portion.

7. The check valve according to claim 5, wherein the straight circumferential interior edge portion is arranged at an angle of 45 degrees to the longitudinal axis.

8. The check valve according to claim 1, comprising a resiliently flexible fastening element for clamping the valve element to the housing by means of inherent resiliently flexible properties of the fastening element.

9. The check valve according to claim 8, wherein one of the housing and the fastening element comprises a projection and the other comprises a recess for receiving the projection to prevent displacement between the fastening element and the housing in a longitudinal direction.

10. The check valve according to claim 8, wherein a straight circumferential interior edge portion at the wide end of the tapered body is arranged in an oblique angle to a longitudinal axis; and wherein the fastening element comprises a clamping surface for engaging a portion of the straight circumferential interior edge portion.

11. The check valve according to claim 1, wherein the curved surface of the protrusion is terminated with a distinct edge.

12. A method for controlling a flow of a fluid by fluid pressure, the method comprising:

a) conducting the fluid to an inlet in a tubular housing of a check valve, the housing having a longitudinal axis;

b) inside the housing, conducting the fluid into contact with a resilient flexible valve element formed as a hollow longitudinally tapered body having an open wide end towards an outlet of the housing and a closed narrow end towards the inlet;

c) increasing the fluid pressure against the valve element to a predetermined threshold value;

d) by means of the increased fluid pressure, deforming the valve element from a default configuration, in which a curved outer surface portion, having a degree of curvature of 85 to 95 degrees, of an outwardly projecting circumferential flange at the wide end of the tapered body is engaged with a corresponding curved surface of a protrusion of the housing to close the check valve, to a deformed configuration, in which the flange is disengaged from a portion of the curved surface and thereby opening the check valve;

e) conducting the fluid out from the housing through the outlet; and f) returning the valve element to the default configuration by means of inherent resilient properties of the valve element when the fluid pressure is reduced to a level below the predetermined threshold value;

wherein the tapered body of the valve element includes an exterior longitudinal tongue; and wherein the housing includes a groove receiving tongue to prevent rotation of the valve element relative to the housing.

13. The method according to claim 12, comprising:

bringing a backflow of the fluid entering through the outlet to engage a straight circumferential interior edge portion at the wide end of the tapered body; and forcing the straight circumferential interior edge portion obliquely radially outwards by means of the straight circumferential interior edge portion being arranged in an oblique angle to the longitudinal axis and thereby pressing the flange towards the curved surface.

14. The method according to claim 13, comprising:

forcing the straight circumferential interior edge portion obliquely radially outwards by means of the straight circumferential interior edge portion being arranged in an angle of 45 degrees to the longitudinal axis and thereby pressing the flange towards the curved surface in a corresponding angle.

15. A check valve for controlling a flow of a fluid by fluid pressure, the check valve comprising:

a tubular housing; and a resilient flexible valve element arranged at least partially inside the housing;

wherein the housing forms a conduit having a longitudinal center axis for the fluid, and has an inlet and an outlet for the fluid;

wherein the valve element is formed as a hollow and longitudinally tapered body with an open wide end directed towards the outlet and a closed narrow end directed towards the inlet;

wherein the wide end of the valve element, in a default configuration, engages an inner surface of the housing to close the check valve and is deformable by a predetermined fluid pressure from the inlet to open the check valve;

wherein the tapered body has a radially outwardly projecting flange at the wide end;

wherein the flange has a curved outer surface portion having a degree of curvature of 85 to 95 degrees;

wherein the housing is formed with a protrusion having a curved surface for engaging the curved outer surface portion of the flange;

wherein the tapered body of the valve element includes an exterior longitudinal tongue; and wherein the housing includes a longitudinal groove for receiving only the tongue.

* * * * *